United States Patent
da Rosa

(10) Patent No.: US 12,447,891 B2
(45) Date of Patent: Oct. 21, 2025

(54) WINCH BAR AND RELATED WINCH SYSTEM

(71) Applicant: Ancra International LLC, Azusa, CA (US)

(72) Inventor: Joaquim C. da Rosa, Independence, KY (US)

(73) Assignee: Ancra International LLC, Azusa, CA (US)

( * ) Notice: Subject to any disclaimer, the term of this patent is extended or adjusted under 35 U.S.C. 154(b) by 362 days.

(21) Appl. No.: 17/540,012

(22) Filed: Dec. 1, 2021

(65) Prior Publication Data
US 2022/0176867 A1    Jun. 9, 2022

Related U.S. Application Data

(60) Provisional application No. 63/122,616, filed on Dec. 8, 2020.

(51) Int. Cl.
    *B60P 7/08*      (2006.01)

(52) U.S. Cl.
    CPC .................. *B60P 7/0853* (2013.01)

(58) Field of Classification Search
CPC ...... B60P 7/0853; B60P 7/083; B65H 75/406; B65H 75/4431; B65H 75/4492; B65H 54/585; B65H 2402/412; B65H 2701/375; B65H 2701/537
See application file for complete search history.

(56) References Cited

U.S. PATENT DOCUMENTS

| | | | | |
|---|---|---|---|---|
| 5,425,154 A | * | 6/1995 | Edwards, Jr. .......... | B60P 7/0853 74/543 |
| 6,092,437 A | * | 7/2000 | Sumner .................. | B60P 7/0853 74/543 |
| 6,659,697 B1 | * | 12/2003 | Guenther .............. | B60P 7/0853 410/12 |
| D499,327 S | * | 12/2004 | Breneman ...................... | D8/309 |

(Continued)

FOREIGN PATENT DOCUMENTS

| CA | 2372260 A1 | 8/2003 |
|---|---|---|
| CA | 2454597 A1 | 7/2005 |
| CN | 201169521 Y | 12/2008 |

OTHER PUBLICATIONS

CA 2454597 A1 English translation (Year: 2024).*

(Continued)

*Primary Examiner* — Anna M Momper
*Assistant Examiner* — Nathaniel L Adams
(74) *Attorney, Agent, or Firm* — Shook, Hardy & Bacon L.L.P.

(57) ABSTRACT

A winch system may include a winch bar and a winch. The winch may have a base, a spool that is rotatable relative to the base, and a drive hub fixed to the spool such that when the drive hub rotates, the spool also rotates. The winch bar may include a winch engagement portion at an end of a shaft, where the winch engagement portion includes a protrusion configured to engage a socket of the drive hub, where the winch engagement portion includes a first contact surface for contacting an outer surface of the drive hub, where the winch engagement portion includes a second contact surface for contacting the outer surface of the drive hub, and where the first contact surface is substantially parallel to the second contact surface.

15 Claims, 4 Drawing Sheets

(56) References Cited

U.S. PATENT DOCUMENTS

| | | | |
|---|---|---|---|
| 6,854,939 B2 | 2/2005 | Im | |
| 7,216,849 B2 | 5/2007 | Tremblay | |
| 7,357,612 B1 * | 4/2008 | Paul | B60P 7/0853 |
| | | | 279/144 |
| 7,410,334 B2 * | 8/2008 | McGrew | B60P 7/0853 |
| | | | 410/100 |
| 7,410,336 B2 * | 8/2008 | Parks | B60P 7/0846 |
| | | | 279/144 |
| 7,740,232 B2 | 6/2010 | Westberg | |
| D624,802 S * | 10/2010 | Salter | D8/309 |
| D684,847 S * | 6/2013 | Browning, Sr. | D8/359 |
| 2003/0215301 A1 | 11/2003 | Guenther | |
| 2008/0029745 A1 | 2/2008 | Chartier | |
| 2008/0303007 A1 * | 12/2008 | Drinkhorn | B60P 7/0853 |
| | | | 254/223 |

OTHER PUBLICATIONS

International Preliminary Report on Patentability received for PCT Application No. PCT/US2021/061890, mailed on Jun. 22, 2023, 11 pages.

International Search Report and Written Opinion received for PCT Patent Application No. PCT/US2021/061890, mailed on Mar. 23, 2022, 13 pages.

* cited by examiner

WINCH BAR AND RELATED WINCH SYSTEM

RELATED APPLICATION

This application claims the benefit of, and priority to, U.S. Provisional Application Ser. No. 63/122,616, filed Dec. 8, 2020, which is incorporated by reference herein in its entirety.

TECHNICAL FIELD

This disclosure relates to winch bars and related winches for use in cargo securement systems.

BACKGROUND

Winch systems are often used to tighten and lock straps in cargo systems. These straps may be used to secure one or more objects on moving trucks, trailers, or other transport devices. For example, the cargo on a flatbed truck is typically secured using straps, where each strap is secured to a fixed point on one end (e.g., with a hook) and to a winch on its other end. The slack within the strap is eliminated by turning the drive hub of a winch such that the strap wraps around a drum or spool.

As some flatbed trucks (and other transport devices) have 20 or more winches, the process of securing the cargo can be tedious and time consuming. To speed up the process, some winches include a winch bar that engages the winch's drive hub. While such devices are used with some success, they come with several drawbacks (as described below). The present disclosure describes an improved winch bar.

BRIEF DESCRIPTION OF THE DRAWINGS

Certain features, aspects, and advantages of the disclosed embodiments are shown in the drawings accompanying this description. The drawings are briefly described below.

DETAILED DESCRIPTION

Figure 1:
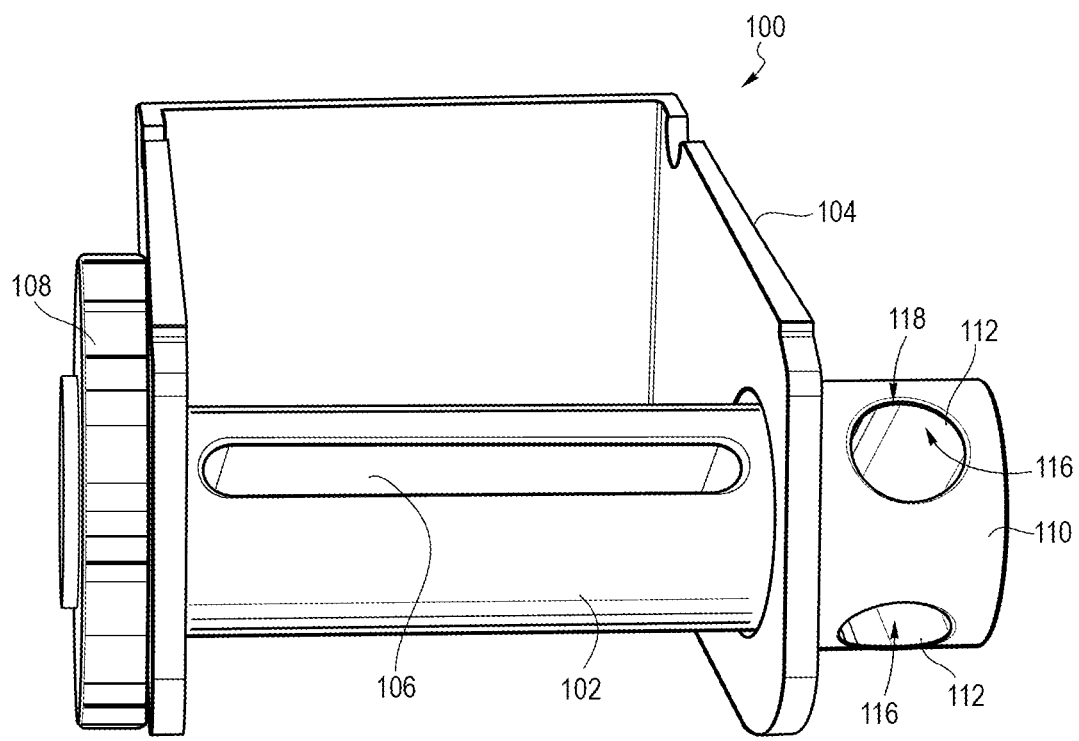
FIG. 1 is an illustration showing a front perspective view of a winch for use in a winch system in accordance with certain aspects of the present disclosure.

The present embodiments are described with reference to the drawings in which like elements are referred to by like numerals. The relationship and functioning of the various elements of this invention are better understood from the following detailed description. However, the embodiments of the invention are not limited to the embodiments illustrated in the drawings. It should be understood that in certain instances, details have been omitted which are not necessary for an understanding of the present invention, such as conventional fabrication and assembly.

FIG. 1 shows a winch 100 for use in a winch system in accordance with the present disclosure. As shown, the winch 100 may include a drum or spool 102 that is rotatable within a winch base 104. The spool 102 may include a strap slot 106 for receiving a strap (not shown). To tighten the strap (e.g., to secure a load), an end of the strap may be placed in the strap slot 106, and then the spool 102 may rotate relative to the winch base 104 such that the strap wraps around an outer periphery of the spool 102. As the spool 102 rotates, the strap may overlap itself such that the strap cannot be pulled loose.

Optionally, the winch 100 may include a ratchet wheel 108. In exemplary embodiments, the ratchet wheel 108 is fixed relative to the spool 102. A pawl, which may be fixed to the winch base 104, may engage the teeth of the ratchet wheel 108 such that the ratchet wheel 108 can spin only in one direction (e.g., such that the strap can be tightened but not loosened). The pawl may be spring loaded or otherwise biased such that it engages the teeth of the ratchet wheel 108. Further, the pawl may be designed such that it can be manually released by a user, thereby disengaging the ratchet wheel 108 and allowing the strap to be loosened by spinning the spool 102 in the opposite direction.

A drive hub 110 may be included for driving the spool 102. For example, the drive hub 110 may be fixed relative to the spool 102 such that when the drive hub 110 rotates, the spool 102 also rotates. The drive hub 110 may include one or more sockets 112 for receiving a winch bar, as discussed in more detail below. The sockets 112 may be through holes that extend through the drive hub 110, depressions or other cavities that extend into the drive hub 110, hooks extending from the drive hub 110, or any other suitable structure for engaging a winch bar 200.

Figure 2:
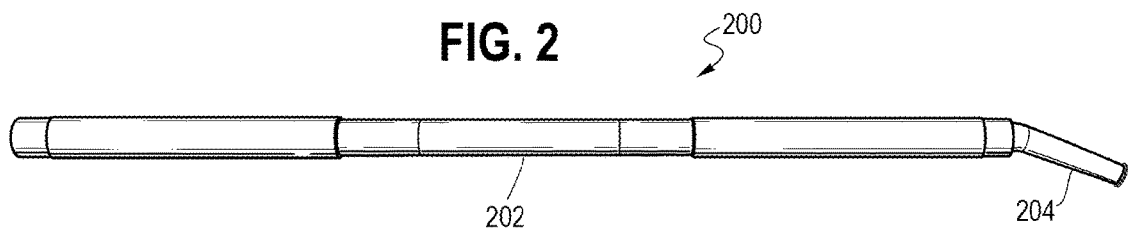
FIG. 2 is an illustration showing a side view of a prior art winch bar.

FIG. 2 shows a winch bar 200 of the prior art. Referring to FIGS. 1-2, the winch bar 200 include a shaft 202 having an end 204 that is sized to fit within one or more of the sockets 112 of the winch's drive hub 110. A force may then be applied to the shaft 202 of the winch bar 200 (e.g., in a direction perpendicular to the shaft's longitudinal axis), thereby providing a torque to cause the spool 102 to spin around its axis. The length of the winch bar 200 provides mechanical advantage such that the strap can be tightened without undue human effort.

While the winch bar 200 of FIG. 2 has been used with success, it has several shortcomings. For example, it can be difficult to insert the end 204 of the winch bar's shaft 202 into the sockets 112 of the drive hub 110. This can frustrate the process of securing a load, particularly when dealing with multiple winches and/or when the winch bar 200 must be removed and reinserted multiple times during the tightening process. Further, the sufficiency of the winch bar's engagement is not always apparent to a user. Without full engagement, the end 204 of the winch bar 200 may fall out of the socket 112 upon receipt of an input force. At minimum, this may cause frustration to the user and increase the time needed to secure the load. Under some conditions, sudden disengagement may be hazardous to the user and/or may cause the winch bar 200 to be lost.

Figure 3:
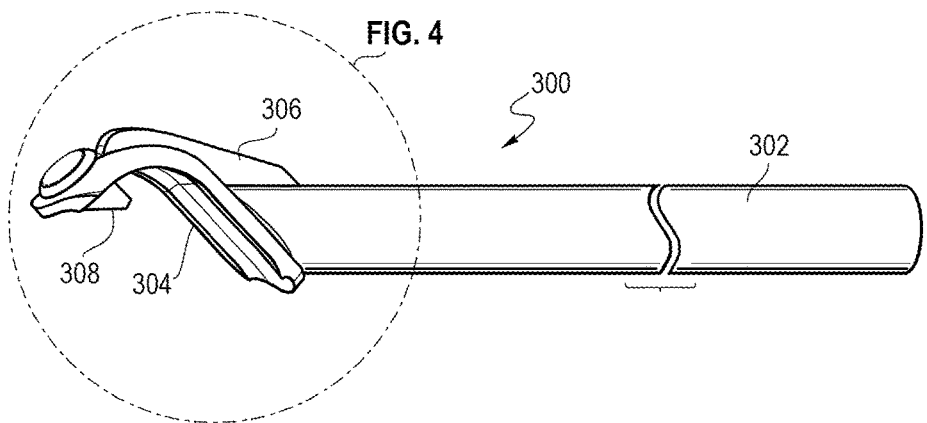
FIG. 3 is an illustration showing a side view of a winch bar having a winch engagement portion in accordance with certain aspects of the present disclosure.
Figure 4:
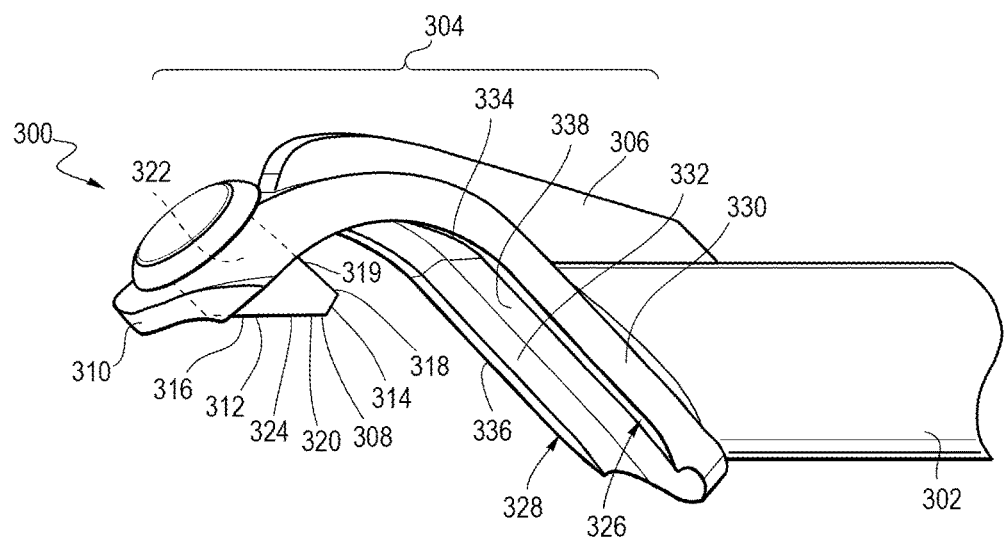
FIG. 4 is an illustration showing a magnified view of the winch bar's winch engagement portion of FIG. 3.

An improved winch bar 300 is shown in FIG. 3-4, which addresses these issues. The winch bar 300 generally includes a shaft 302, a winch engagement portion 304 located at an end of the shaft 302, and an optional support rib 306 to ensure that the winch bar 300 has sufficient strength and durability (when necessary). Like the version discussed above, the winch bar 300 generally functions to provide mechanical advantage for tightening a winch. As discussed in more detail below, the winch bar 300 is advantageous over prior versions at least since it provides an improved degree of engagement with the drive hub 110 of the winch 100, decreases the difficulty of use for a user, and provides clear feedback to the user when engagement is sufficient.

Referring to FIG. 1 and FIG. 4, the winch engagement portion 304 of the winch bar 300 includes a protrusion, such as a pin 308, that is sized for receipt by the sockets 112 of the winch's drive hub 110. The pin 308 extends from a head portion 310 of the winch engagement portion 304. Herein, the "bottom 312" of the pin 308 is defined as the portion furthest from the head portion 310 and the "top 314" of the pin 308 is defined as the portion of the pin 308 that is adjacent to the head portion 310.

The pin 308 may include a unique design for decreasing the difficulty of inserting the pin 308 into the socket 112. For example, the pin 308 may include a chamfer 312 such that the pin 308 decreases in cross-sectional area as it extends towards the bottom 314 of the pin 308. In such an embodiment, the top 316 of the pin 308 may have a diameter that is substantially the same as a diameter of the sockets 112 (but perhaps slightly smaller to allow for a slip fit engagement and to avoid a more permanent interference fit). The smallest cross-sectional area of the pin 308 may be located at the bottom 314 of the pin 308, which may be a location that is inside the socket 112 of the winch's drive hub 310 during use. Thus, top 316 of the pin 308 may have a cross-sectional area that is greater than a cross-sectional area of the bottom 314 of the pin 308.

When the chamfer 312 is included, it may be located on a side of the pin 308 that is opposite to where the pin 308 applies a force to an inner wall 116 of the socket 112. To illustrate, a first side 318 of the pin 308 may include an area that receives the input force (via the shaft 302) and applies a force to an inner wall of the socket 112. This first side 318 may have a generally uninterrupted cylindrical face such that its edge 319 is parallel to the longitudinal axis 322 of the pin 308. Advantageously, such a structure maximizes the surface area where pressure/force is transferred from the winch bar 300 to the socket 112, and it causes the force to be applied in a direction directly perpendicular to the rotational axis of the drive hub 110 (to maximize torque). By contrast, a second side 320 of the pin 308, which is opposite the first side 318, may include an edge 324 that is diagonal relative to the longitudinal axis of the pin 308. This diagonal edge 324 forms the chamfer 312.

Figure 5:
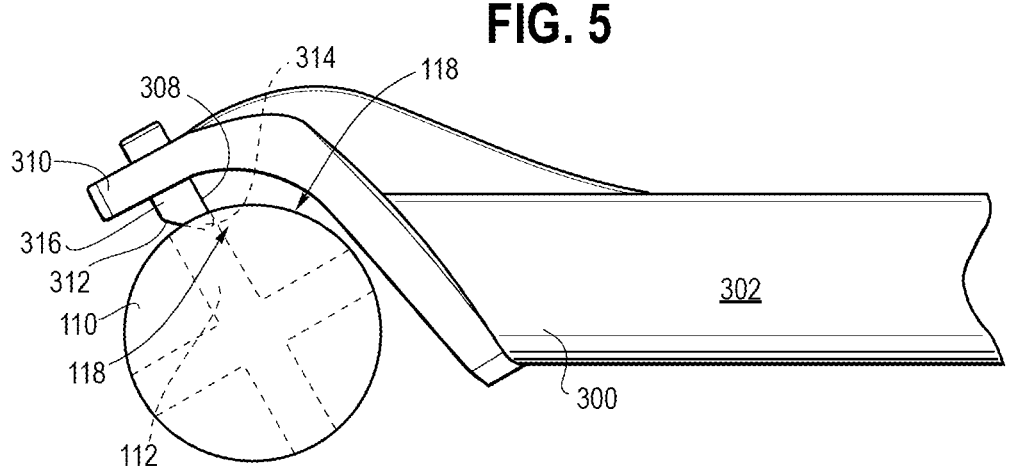
FIG. 5 is an illustration showing the winch bar of FIG. 3 as it initiates engagement with a drive hub of a winch in accordance with certain aspects of the present disclosure.
Figure 6:
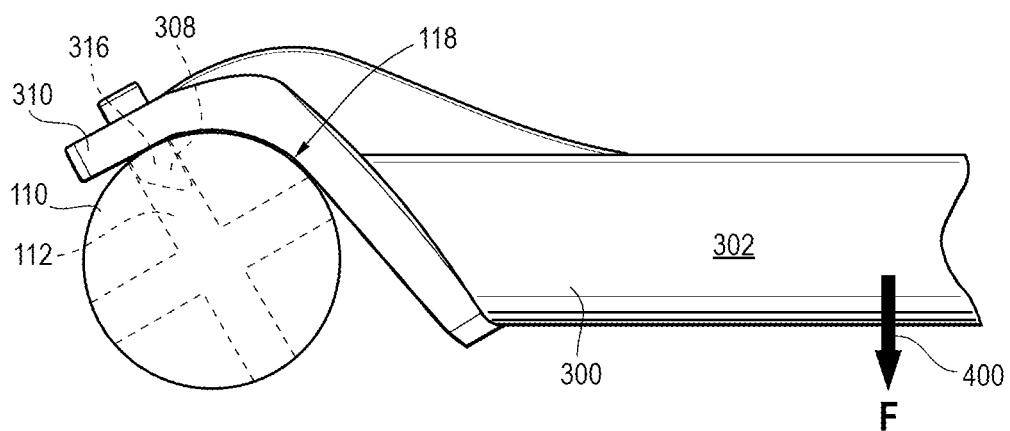
FIG. 6 is an illustration showing the winch bar of FIG. 3 upon full engagement with a drive hub of a winch in accordance with certain aspects of the present disclosure.

FIGS. 5-6 illustrate certain advantages of the chamfer 312. For example, the chamfer 312 of the pin 308 may be advantageous for reducing the precision necessary for placing the pin 308 into one of the sockets 112. Since the bottom 314 of the pin 308 is relatively small, it slips easily into the entrance of the socket 112 (as shown in FIG. 5). As the user then pulls on the winch bar 300, the pin 308 slides into the socket 112 until the pin 308 is fully received by the socket 112 and the head portion 310 contacts the outer surface 118 of the drive hub 110 (as shown in FIG. 6). In the state depicted by FIG. 6, engagement between the pin 308 and the socket 112 is snug since the top 316 of the pin 308 is substantially the same cross-sectional size as the socket 112. A user may then apply a force on the shaft 302 in the direction 400 such to drive the winch and tighten a strap.

Referring back to FIG. 4, the depicted winch bar 300 also includes a first contact surface 326 located on a first rail 330 and the second contact surface 328 located on a second rail 332. Each of the first contact surface 326 and the second contact surface 328 is configured for abutting an outer perimeter of the drive hub 110 when the winch bar 300 is in use. Optionally, the first rail 330 and the second rail 332 may have curved contours 334 that generally follow the outer perimeter of the drive hub 110 adjacent to the socket 112. Advantageously, if the winch bar 300 is misaligned or not fully engaged, such misalignment of these contours will be obvious to a user since they will not fully contact the drive hub 110, and the issue can be addressed prior to an attempt to tighten the winch 100. Further, the first rail 330 and/or the second rail 332 may have portions 336 where the first contact surface 326 and/or the second contact surface 328 are parallel to the edge 319 of the pin 308 to enhance the engagement of the winch bar 300 when in use.

Optionally, a gap 338 may be located between the first rail 330 and the second rail 332. When in included, the gap 338 may reduce the winch bar's material requirements and/or may increase the precision of the fit between the winch bar 300 and the drive hub 110 by isolating the first contact surface 326 and the second contact surface 328. Further, spacing the first rail 330 from the second rail 332, and thus the first contact surface 326 from the second contact surface 328, may facilitate a stable engagement between the winch bar 300 and the drive hub 110 of the winch 100. For example, the two points of abutment with the outer surface 118 of the drive hub 110 may prevent rocking or wobbling of the winch bar 300 when under stress from an input force. Further, forces may be distributed among a larger surface area (on both the drive hub 110 and the winch bar 300) which may reduce wear and/or the potential for failure of these components.

Figure 8:
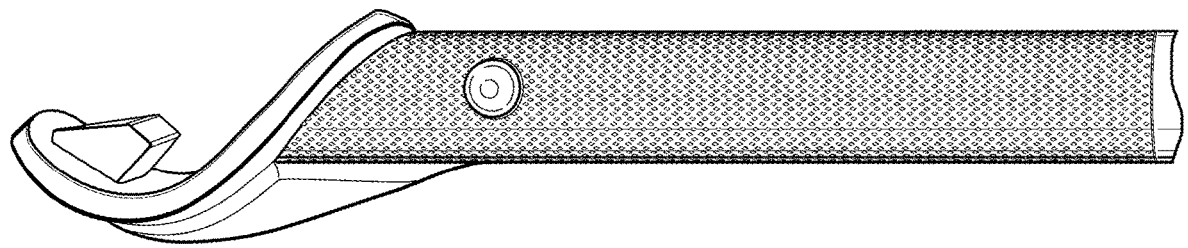
FIG. 8 is an illustration showing a winch bar having an alternative design having a winch engagement protrusion for engagement with a winch's drive up in accordance with certain aspects of the present disclosure.
Figure 9:
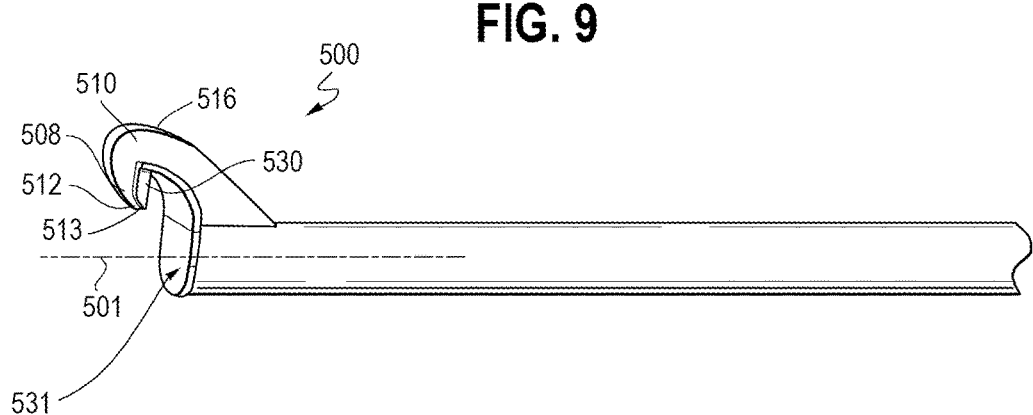
FIG. 9 is an illustration showing a winch bar having a winch engagement portion with a single large contact surface in accordance with certain aspects of the present disclosure.
Figure 10:
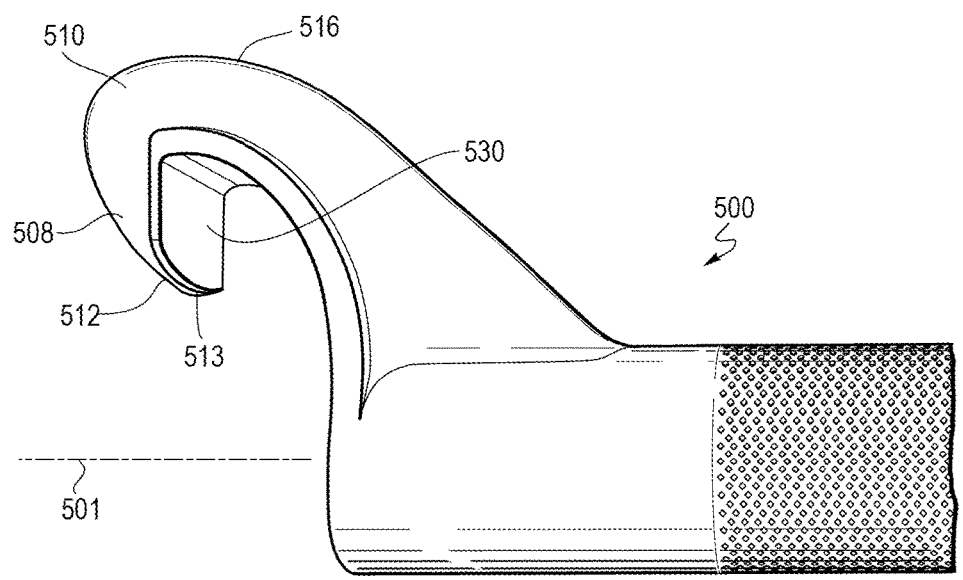
FIG. 10 is an illustration showing an end of the winch bar of FIG. 9.

While two rails and two contact surfaces are shown in the depicted embodiment, it is alternatively contemplated that the gap 338 may be excluded such that a single, relatively large contact surface spans substantially the entire cross section of the winch engagement portion 304, such as shown in FIG. 8 (and also FIGS. 9-10, e.g., surface 531). For example, the width of this single contact surface may be at least 120% of the diameter or other cross-sectional dimension of the shaft, such as 150% as large, 200% as large, or larger. In other embodiments, more than two rails and/or other suitable structures may be included for providing two or more contact surfaces.

Figure 7:
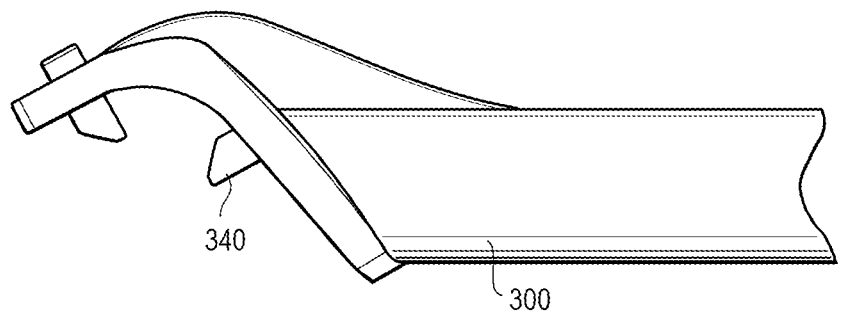
FIG. 7 is an illustration showing a winch bar having two pins for engagement with two sockets of a winch's drive hub in accordance with certain aspects of the present disclosure.

As shown in FIG. 7, it is further contemplated that a second pin 340 may be included that extends in a direction that is substantially perpendicular to the longitudinal axis 322 of the pin 308. The optional second pin 340 may engage an additional socket for further enhancing the stability of the winch bar 300 during use. Like the pin 308, the second pin 340 may be chamfered or otherwise have a varying cross-sectional area to facilitate receipt by a socket 112 of the drive hub 110.

FIG. 8 shows another optional winch engagement portion, which lacks the pins discussed with reference to certain embodiment above. Instead of the pins, the winch engagement portion of FIG. 8 includes a protrusion, which may be integrally formed with the surrounding material. While any size of the contact surface is contemplated, in some versions, the width of the contact surface (e.g., a dimension in the direction perpendicular to the longitudinal direction of the shaft) is at least as wide as, and perhaps wider than, the shaft.

FIGS. 9-10 show another embodiment of a winch bar 500. As shown, the winch bar 500 may function in a manner similar to the embodiments discussed above, but may have a construction that is slightly different for purpose of manufacturing efficiency, for example. In particular, the winch bar 500 may include a head portion 510 that curves towards a longitudinal axis of the handle of the winch bar 500. More particularly, the terminal end of the curved head portion 510 may include a protrusion 508 extending away from a top 516 of the head portion 510 and towards the longitudinal axis 501 of the handle of the winch bar 500. The protrusion 508 may generally include the features discussed above with respect to the pin 308 (FIG. 4), and therefore may be configured for fitting into a socket of a winch's drive hub. For example, the protrusion 508 may include a chamfer 512 or otherwise reduce a cross-sectional dimension as it nears its terminus 513. Optionally, a durable contact surface 530 may be located on the protrusion 508 for contacting the drive hub socket, for example.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

Having described various aspects of the subject matter, additional disclosure is provided below, which includes certain aspects consistent with the originally-filed claims located at the end of this specification. Variations of any of the features discussed below are contemplated.

One general aspect includes a winch system, including: a winch, the winch including a base, a spool that is rotatable relative to the base, and a drive hub fixed to the spool such that when the drive hub rotates, the spool also rotates; and a winch bar, the winch bar including a winch engagement portion at an end of a shaft, where the winch engagement portion includes a pin or other protrusion configured to engage a socket of the drive hub, where the winch engagement portion includes a first contact surface for contacting an outer surface of the drive hub, where the winch engagement portion includes a second contact surface for contacting the outer surface of the drive hub, and where the first contact surface is substantially parallel to the second contact surface. Implementations may optionally include one or more of the features discussed below.

The first contact surface may be located on a first rail, where the second contact surface is located on a second rail, and where the first rail is spaced from the second rail such that a gap is located between the first rail and the second rail. At least one of the first rail and the second rail may include a curved contour having a diameter that is substantially equal to a diameter of the outer surface of the drive hub. The pin may include a chamfer. A top of the pin may have a cross-sectional area that is greater than a cross-sectional area at a bottom of the pin, the top of the pin being adjacent to a head portion of the winch bar. The top of the pin may include a diameter that is substantially equal to a diameter of the socket. The head portion may contact the outer surface of the drive hub when the winch bar fully engages the drive hub. A first side of the pin may include a cylindrical face, and where an opposite second side of the pin includes an edge that is angled relative to a longitudinal axis of the pin. The cylindrical face may be configured to apply a force to an inner wall of the socket upon receipt of an input force by the shaft. The winch engagement portion may include a second pin for engaging a second socket of the drive hub. At least one of the first contact surface and the second contact surface may include a surface portion that is substantially parallel to a longitudinal axis of the pin.

Another general aspect includes a winch bar, including: a shaft and a winch engagement portion at an end of the shaft, where the winch engagement portion includes a pin or other protrusion configured to engage a socket of a winch, where the winch engagement portion includes a first rail having a first contact surface configured for abutting a drive hub of the winch, where the winch engagement portion includes a second rail having a second contact surface configured for abutting the drive hub of the winch, and where the first rail is separated from the second rail such that a gap is located between the first rail and the second rail. Implementations may optionally include one or more of the features discussed below.

At least one of the first rail and the second rail may include a curved contour having a diameter that is substantially equal to a diameter of an outer surface of the drive hub. At least one of the first contact surface and the second contact surface may include a portion that is parallel to a longitudinal axis of the pin.

Another general aspect includes a winch bar, including a shaft and a winch engagement portion at an end of the shaft, where the winch engagement portion includes a pin or other protrusion configured to engage a socket a winch, and where the pin includes a chamfer. Implementations may optionally include one or more of the features discussed below.

A top of the pin may have a cross-sectional area that is greater than a cross-sectional area at a bottom of the pin. A first side of the pin may include a cylindrical face, where an opposite second side of the pin includes an edge that is angled relative to a longitudinal axis of the pin. The cylindrical face may be configured to apply a force to an inner wall of the socket upon receipt of an input force by the shaft. The top of the pin may have a diameter that is substantially equal to a diameter of the socket. The winch engagement portion may further include a first contact surface and a second contact surface configured for abutting an outer surface of the drive hub when the pin engages the socket, the first contact surface being parallel to the second contact surface. Alternatively, a single contact surface may be included for abutting an outer surface of the drive hub when the pin engages the socket, where the single contact surface has a width that is larger than a diameter of the shaft.

I claim:

1. A winch system, comprising:
a winch, the winch including a base, a spool that is rotatable relative to the base about a drive hub axis, and a drive hub that comprises a drive hub cylindrical outer surface and that is fixed to the spool such that, when the drive hub rotates, the spool also rotates about the drive hub axis; and
a winch bar, the winch bar including a winch engagement portion at an end portion of a shaft, the end portion having a longitudinal axis and an end portion cylindrical outer surface;
wherein:
the winch engagement portion comprises:

a protrusion configured for receipt within a socket of the drive hub when the longitudinal axis is perpendicular to the drive hub axis and the longitudinal axis intersects the drive hub;

a curved head portion including a support rib, the support rib comprising a flat hook-shaped flange extending out of the end portion cylindrical outer surface in a plane that is coplanar with the longitudinal axis, the support rib connecting the protrusion to the end portion of the shaft in a permanently fixed position and orientation relative to the end portion of the shaft;

a first contact surface for contacting the drive hub cylindrical outer surface, the first contact surface extending perpendicularly from a curved edge of the support rib flange;

the protrusion includes a second contact surface for contacting an inner surface of the socket; and the second contact surface is wider than the support rib in a first direction perpendicular to the plane.

2. The winch system of claim 1, wherein the first contact surface includes a curved contour having a diameter that is substantially equal to a diameter of the drive hub cylindrical outer surface.

3. The winch system of claim 1, wherein the protrusion includes a chamfer.

4. The winch system of claim 1, wherein a top of the protrusion has a cross-sectional area that is greater than a cross-sectional area at a bottom of the protrusion, the top of the protrusion being adjacent to an end of the support rib.

5. The winch system of claim 1, wherein the first contact surface contacts the drive hub cylindrical outer surface and the second contact surface contacts the inner surface of the socket when the winch bar fully engages the drive hub.

6. The winch system of claim 1, wherein at least one of the first contact surface and the second contact surface includes a surface portion that is substantially perpendicular to a longitudinal axis of the protrusion.

7. The winch system of claim 1, wherein the first contact surface is wider than the support rib in the first direction.

8. The winch system of claim 7, wherein the first contact surface is continuous with the second contact surface.

9. The winch system of claim 1, wherein the second contact surface comprises a curved face.

10. A winch bar, comprising a shaft comprising an end portion having a longitudinal axis and end portion cylindrical outer surface; and a winch engagement portion at the end portion;

wherein the winch engagement portion includes:

a first contact surface for contacting a drive hub cylindrical outer surface of a drive hub of a winch when the longitudinal axis is perpendicular to a drive hub axis about which the drive hub rotates;

a protrusion configured to engage a socket in the drive hub, the protrusion including a second contact surface for contacting an inner surface of the socket when the longitudinal axis of the end portion intersects the drive hub, and a curved head portion including a support rib comprising a flat hook-shaped flange extending out of the end portion cylindrical outer surface in a plane that is coplanar with the longitudinal axis, the support rib connecting the protrusion to the shaft in a permanently fixed position and orientation relative to the shaft, the support rib being narrower than the second contact surface in a first direction perpendicular to the plane;

wherein the first contact surface extends perpendicularly from a curved edge of the support rib flange.

11. The winch bar of claim 10, wherein a top of the protrusion has a cross-sectional area that is greater than a cross-sectional area at a bottom of the protrusion.

12. The winch bar of claim 10, wherein the first contact surface has a width that is larger than a diameter of the shaft.

13. The winch bar of claim 10, wherein the first contact surface is wider than the support rib in the first direction.

14. The winch bar of claim 13, wherein the first contact surface is continuous with the second contact surface.

15. The winch bar of claim 10, wherein the second contact surface comprises a curved face.

* * * * *